United States Patent [19]
Chaney et al.

[11] Patent Number: 5,930,822
[45] Date of Patent: *Jul. 27, 1999

[54] METHOD AND SYSTEM FOR MAINTAINING STRONG ORDERING IN A COHERENT MEMORY SYSTEM

[75] Inventors: Kenneth Chaney; David M. Chastain; David M. Patrick, all of Plano, Tex.

[73] Assignee: Hewlett-Packard Co., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,330

[22] Filed: Sep. 27, 1996

[51] Int. Cl.⁶ .................................................. G06F 13/18
[52] U.S. Cl. ........................................... 711/150; 711/158
[58] Field of Search .................................... 711/141, 143, 711/144, 145, 147, 148, 149, 150, 151, 154, 158

[56] References Cited

PUBLICATIONS

Stenström, "A Latency—Hiding Scheme for Multiprocessors with Buffered Multistage Networks", 1992, pp. 39–42, IEEE.

*Primary Examiner*—Eddie P. Chan
*Assistant Examiner*—Kevin L. Ellis

[57] ABSTRACT

A method and system of maintaining strong ordering in a multiprocessor computer system having a coherent memory. Memory transactions are send from one or more processors to a processor agent. The processor agent sends the transactions to a memory agent via a crossbar switch. The memory agent performs memory coherency operations and sends memory transactions back to the processor agents via the crossbar switch. The crossbar switch, however, may alter the order in which the memory transactions are forwarded to the processor agent. Therefore, the memory agent also sends a timestamp for each memory transaction directly to the processor agent via a dedicated link. An arbitrator within the processor agent receives the timestamps and the memory transactions. Using the timestamps, the arbitrator reorders the memory transactions and sends the transactions to the processors in the order in which the transactions were sent. In addition, the memory agent sends a parity signal with each timestamp. Specific combinations of parity signals and timestamps tell the arbitrator the type of transaction it will receive from the memory agent. Dependent upon the type of transaction, the arbitrator can change the order in which the transactions are sent to the processors.

21 Claims, 2 Drawing Sheets

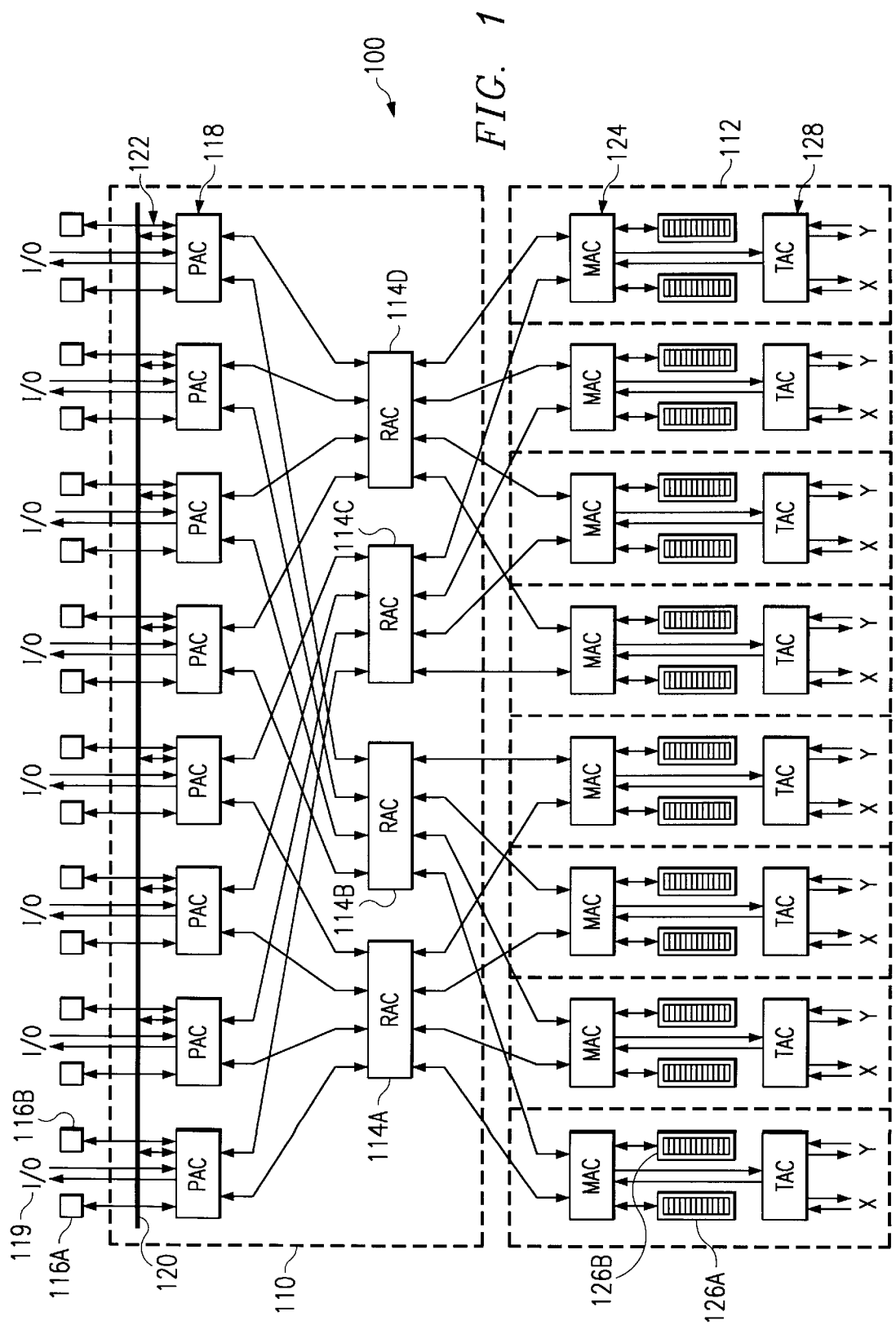

METHOD AND SYSTEM FOR MAINTAINING STRONG ORDERING IN A COHERENT MEMORY SYSTEM

RELATED APPLICATIONS

This application is related to U.S. patent application Ser. No. 08/720,368, ERROR CONTAINMENT CLUSTER OF NODES now U.S. Pat. No. 5,845,071; U.S. patent application Ser. No. 08/720,331, entitled ROUTING METHODS FOR A MULTINODE SCI COMPUTER SYSTEM; and U.S. patent application Ser. No. 08/720,332, entitled TIME OF CENTURY COUNTER SYNCHRONIZATION USING A SCI INTERCONNECT; all filed concurrently with this application, and hereby incorporated by reference herein. These applications are commonly assigned.

TECHNICAL FIELD OF THE INVENTION

This invention pertains in general to multiprocessor computer systems and in particular to a method and system for maintaining cache coherency in such systems.

BACKGROUND OF THE INVENTION

A multiprocessor computer system typically has a large number of interconnected processing nodes. Each node, in turn, can have up to 16 processors. Each processor, moreover, may have one or more memory caches. These caches hold programs and data required by the processors. Significant hardware in the computer system is dedicated to ensuring that each cache holds coherent data. That is, that each cache accurately reflects the contents of main memory.

In some multiprocessor systems, the caches are "strongly ordered." In a strongly ordered system, a processor sees the stores of other processors in the same node in the same order in which the stores are made.

In a strongly ordered system, the stores can be used as semaphores. Consider, for example, the sequence of stores shown below:

TABLE 1

| CPU 0 | CPU 1 |
|---|---|
| Store A' | Load B |
| Store B' | Load A |

In this sequence, line A' is data while line B' is a semaphore protecting line A' from premature use. CPU 0 only modifies B' after it is through modifying A'. Since B is a semaphore, CPU 1, does not use A until after it sees that B has been modified. Strong ordering requires that CPU 1 never have the old value of A and the new value of B at the same time. Otherwise, CPU 1 could use stale data for A instead of the newly stored value.

In prior art systems, strong ordering was maintained by sending purge commands to other processors and receiving a response back. Thus, in the example of Table 1, CPU 0 would send a command to CPU 1 telling CPU 1 to purge line A. Once CPU 1 had completed the purge, it sent a "purge done" response back to CPU 0. CPU 0 waited until it received "purge done" responses back from all of the other processors before it modified B'.

A problem with waiting for "purge done" responses is the delay caused by waiting for the purge command and responses to make the round trip. This delay becomes considerable when it is multiplied by the number of stores performed by each processor during normal operation of the computer system. In addition, additional logic must be placed on each cache controller to send, receive, and count the purge commands and responses.

Therefore, there is a need in the art for a method and system of maintaining strong ordering that does not require sending purge commands and waiting for responses thereto.

In addition, there is a need in the art for a method and system of maintaining strong ordering that does not require additional counting logic on the cache controller.

SUMMARY OF THE INVENTION

The above and other needs are met by a method and system of strong ordering that uses timestamp signals to indicate the order in which transactions are sent to each processor. The timestamp signals travel via dedicated pathways having fixed transmission latencies. Therefore, the processor always receives the timestamp signals in the order in which the signals were sent.

An arbitrator receives both the timestamp signals and the memory transactions. The timestamp signals are buffered in the order in which they are received. The memory transactions are received from a crossbar. Since the crossbar may reorder the transactions, the arbitrator does not necessarily receive the transactions in the same order as they were sent. By using timestamp signals, the arbitrator can rearrange the transactions into the proper order.

In addition, a parity bit accompanies each timestamp signal. A specific sequence of timestamp and parity bits indicates that the corresponding transaction is a data return. Since the transaction is a data return and not a purge operation, the arbitrator knows that it is safe to send other transactions out of sequence.

A technical advantage of the present invention is reduced latency on access to semaphores. Since there is no need to wait for "purge done" responses, a data return can be sent at the same time as the purge transactions. Therefore, there is no need to wait for the "purge done" responses before changing a semaphore.

Another technical advantage of the present invention is that logic is not needed to count the "purge done" responses before the semaphore is changed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a high-level block diagram of a node in a multiprocessor computer system;

DESCRIPTION OF THE PREFERRED EMBODIMENTS

Figure 4:
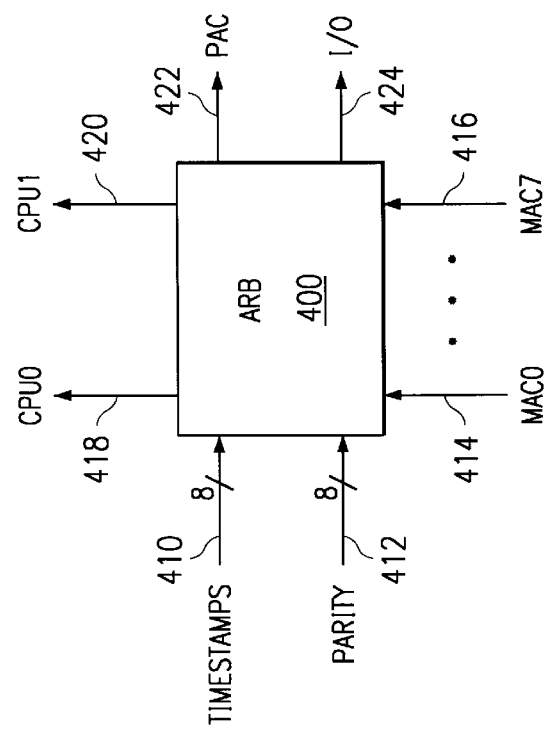
FIG. 4 is a block diagram of an arbitrator.

FIG. 1 is a high-level block diagram of a node 100 of a multiprocessor computer system. The computer system may have only one node 100, or it may have as many as 112 nodes organized into 28 node walls. In such a system, the nodes within a wall are organized as seven X-dimension rings by four Y-dimension rings. The four walls are interconnected by four Z-dimension rings. A bridge node is used to connect a Y-dimension ring to a Z-dimension ring.

Each node in such a system, in which node 100 is exemplary, is divided into a processor side 110, a memory side 112, and a crossbar 114. Note that each side contains a large number of identical elements. For purposes of clarity, this discussion will refer to like elements with a single reference numeral. When distinction is made between two or more like elements, a letter will be added to the reference numeral to identify the element to which the numeral refers.

Processor side 110 contains processor boards 116. Each of the processor boards 116 is coupled to a corresponding processor agent chip (PAC) 118 via a runway bus 122. Each PAC 118, in turn, has an input/output (I/O) subsystem 119 and is coupled to crossbar 114 and core logic access bus 120.

On the other side of crossbar 114 are memory access chips (MACs) 124. Each MAC 124 is coupled to two banks of memory 126a–b and a ring access controller 128, also called a torus access controller (TAC) 128.

Figure 2:
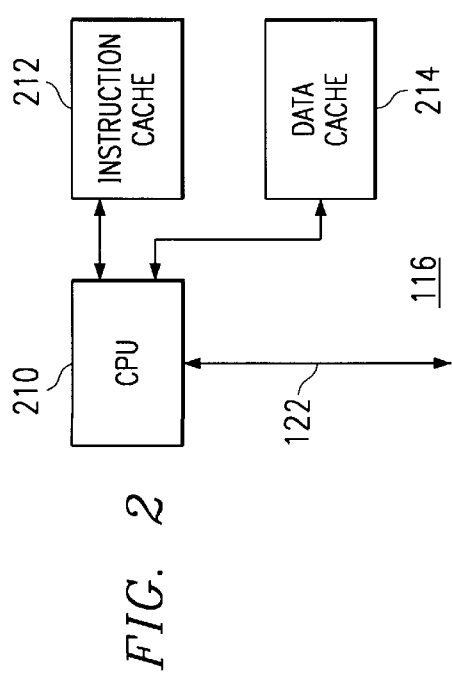
FIG. 2 is a high-level block diagram of a processor board.

As shown in FIG. 1, one embodiment of the present invention has two processor boards coupled to each PAC 118. Therefore, each node 100 can have a total of 16 processor boards 116. FIG. 2 is a high-level block diagram of an exemplary processor board 116. Shown in FIG. 2 are processor (also referred to as CPU) 210, instruction cache 212, data cache 214, and runway bus 122. Processor 210 is preferably a HEWLETT-PACKARD PA-8000 processor. However, the present invention is not limited by processor type or architecture.

Instruction cache 212 and data cache 214 each preferably hold one megabyte of information. As is well known in the art, the caches hold memory lines used by the processor. The techniques for determining which lines are encached is beyond the scope of the present invention and will not be discussed in detail herein. Memory lines are encached using a four state coherency model. This coherency model is further discussed below. As mentioned above, runway bus 122 couples processor 210 to PAC 118.

Returning to FIG. 1, core logic access bus 120 is used primarily for system boot operations. The bus is a low bandwidth multi-drop bus which interfaces all PACs 118 to erasable programmable read-only memory (EPROM), static random access memory (SRAM), a real time clock, and RS-232 and Ethernet interfaces. Additionally, a processor 210 can write to control status registers (CSRs) which are accessed using the bus to initialize and configure crossbar 114.

PAC 118 interfaces the processor boards 116 and I/O subsystem 119 to crossbar 114 and core logic access bus 120. PAC sends and receives transactions from crossbar 114 using four unidirectional data paths.

As shown in FIG. 1, crossbar 114 is actually comprised of four separate routing attachment chips (RACs) 114a–d. Crossbar 114 forwards transactions between PACs 118 and MACs 124. Each RAC 114a–d has 16 32-bit wide unidirectional interconnects coupling each RAC 114a–d to four PACs and four MACs. Crossbar 114 does not have any CSRs of its own, but rather is initialized by writes to CSRs which reside on core access logic bus 120. These CSRs control which ports are active, and enable error detection.

MAC 124 controls access to coherent memory. Although only two banks of memory 126a–b per MAC 124 are shown in FIG. 1, each MAC 124 preferably controls four banks of memory. In this manner, up to 32 memory banks can be controlled in an eight MAC system. Memory banks 126 are preferably dual inline memory modules (DIMMs) of SDRAM. The memory controlled by a MAC 124 is used for node local memory, network caching, and messaging.

As briefly mentioned above with respect to caches 212 and 214, intra-node 100 memory is strongly ordered, directory-based, four state memory. "Strongly ordered," as used herein, means that one processor 210 sees stores made by other processors in the same node in the same order that the stores were made. Strong ordering is maintained between coherent accesses within node 100 by ordering ownership reflections and invalidates. An ownership reflection allows a processor to use a data return. Usually, the ownership reflection is sent to the processor with the data return. Thus, a processor gains ownership of a line when the system reflects the processor's read requests back to it. Strong ordering is also maintained between coherent and non-coherent accesses within node 100.

The memory lines are directory-based. Each memory line tag has a line owner or a sharing mask to indicate which processors and I/O ports have ownership of the line. When a line needs to be flushed or purged, this information is used to direct transactions to only those processors and I/O ports that could have the line.

The memory lines are also four state. Accordingly, a memory line can be: private-dirty, private-clean, shared, or not shared. These four states allow data to be selectively returned private for read shared requests. The first time a line is read shared, it is returned private. A subsequent read shared makes the line shared if the first owner has not dirtied it. This technique is optimized for when a line is not shared—the most common case.

Finally, TAC 128 acts as the interface from node 100 to other nodes in the computer system. TAC 128 communicates with a MAC 124 via two unidirectional data paths. TAC 128 has interfaces to two rings, an X dimension ring and a Y dimension ring.

In general, processor 210 accesses memory by sending a request to crossbar 114. This request is then forwarded to one of the MACs 124. MAC 124 accesses its memory banks 126 and checks error correction and tagged coherency information. Provided that no additional coherency operations are required, the data accessed from memory 126 is returned to processor 210 by sending a response back to crossbar 114. Crossbar 114 then forwards the response to PAC 118, which generates a read response on runway bus 122.

More particularly, processor 210 may issue one of two coherent read transactions: Read_Private and Read_Shar_ or_Priv. The Read_Private transaction is initiated by store instructions. The line containing the requested data is returned to the processor private-clean. If the line is held private-dirty in another processor's cache, then the line is moved from that cache to the requesting processor while updating the stale copy in memory. Otherwise, the requested line is read from memory and all encached copies of the line are purged.

The Read_Shar_or_Priv transaction is initiated by load instructions. The line containing the requested data is returned to the processor either shared or private_clean. If the requested line is held private-dirty in another processor's cache, then the line is copied from the current owner's cache to the requesting processor private-clean while updating the stale copy in memory. If the requested line is held private-clean or shared in other processors' caches, then the requested line is returned shared from memory and any private-clean copy is converted to shared. In addition, the line is returned shared if there is another read request for the same line or if the memory tags indicate a processor has a line private, but when interrogated, the processor is found to no longer have the line. Finally, if the requested line is not held in any other processor cache, then the line is returned private-clean.

Figure 3:
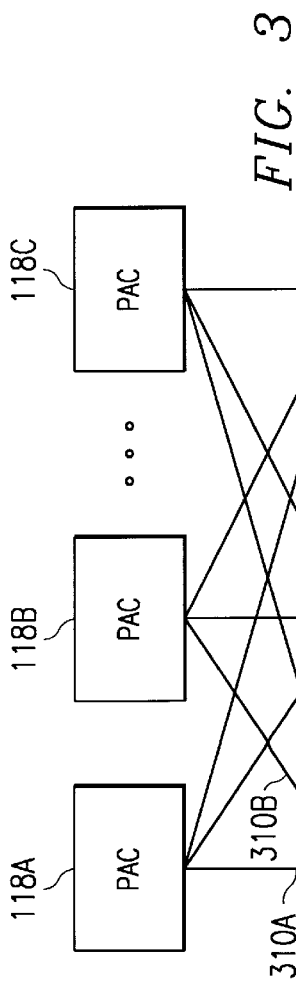
FIG. 3 is a high-level block diagram illustrating how the PACs and MACs are interconnected by the timestamp signal paths.

FIG. 3 is a high-level block diagram illustrating how the PACs 118 and MACs 124 are interconnected to carry out the above sequence of transactions using timestamps. Shown are three PACs 118a–c, three MACs 124a–c, and interconnects 310 connecting the PACs 118 and MACs 124, of which interconnects 310a–c are exemplary. Although only three PACs 118a–c and MACs 124a–c are shown in FIG. 3, a preferred embodiment has eight of each and a total of 64 interconnects.

Interconnects 310 transmit signals from each MAC 124 to each PAC 118. Interconnects 310 are unidirectional and are two bits wide. Each interconnect 310 carries a one-bit timestamp signal and a one-bit parity signal. Note that interconnects 310 are direct links and, therefore, have a fixed transmission latency. Interconnects 310 are not shown in FIG. 1.

In order to communicate with the interconnects 310, each MAC 124 has eight pairs of outputs and each PAC 118 has eight pairs of inputs. When a MAC 124 sends a memory transaction to a PAC 118 via crossbar 114, it also sends a timestamp and a parity bit to that PAC 118 via an interconnect 310. Although crossbar 114 may alter the order of transactions passing through it, the timestamps and parity bits will always arrive at PAC 118 in the same order in which they were sent.

Within each PAC 118 is an arbitrator that receives the timestamp and parity signals. FIG. 4 is a block diagram of arbitrator 400. Arbitrator 400 has timestamp input 410 and parity input 412. Timestamp input 410 and parity input 412 are both eight bits wide. In addition, arbitrator 400 has one input from each MAC 124. However, only two 414, 416 of the inputs from the MACs 124 are shown. Finally, arbitrator 400 has four outputs. The first two outputs 418, 420 go to CPU0 and CPU1, respectively. The third output 422 goes to PAC 118 and is used for accessing control and status registers. The fourth output 424 is used for accessing I/O port 119.

Arbitrator 400 controls the order in which transactions that arrive from crossbar 114 are sent to the processors, PAC 118, or I/O port 119. Note, however, that the PAC 422 and I/O 424 outputs are not strongly ordered. Basically, arbitrator 400 uses the timestamps to figure out the order to send the transactions received from the MACs 124 to the processors 210. The timestamps received from input 410 and the MAC inputs 414, 416 are buffered. Then, the order of the timestamps is applied to the transactions received from the MAC inputs 414, 416. Thus, if a timestamp from a particular MAC 124 is received, arbitrator 400 will not send out any transactions to the processors 210 until a transaction received from the input corresponding to that particular MAC 124 is sent out.

However, arbitrator 400 will allow purges (invalidates) to go to a processor 210 in advance of transactions timestamped ahead of it which have not yet arrived. Strong ordering is maintained for the coherent accesses as long as data returns do not pass purges timestamped ahead of them.

In addition, a preferred embodiment of arbitrator 400 uses the parity bit to further enhance its efficiency. Normally, arbitrator 400 uses odd parity. That is, the parity bit is always opposite of the timestamp bit. However, a preferred embodiment of arbitrator 400 uses the parity bit to determine the type of transaction sent by the MAC 124 when the ownership reflection and data return are sent together. This technique is called "long timestamps".

Table 2 shows how long timestamps are used.

TABLE 2

|  | Timestamp | Timestamp Parity |
| --- | --- | --- |
| data return | 0 | 1 |
|  | 0 | 1 |
|  | 1 | 1 |
|  | 0 | 0 |
|  | 0 | 1 |
| non-data return | 1 | 0 |
|  | 0 | 1 |

By using the signals shown in Table 2, MAC 124 can signal to arbitrator 400 that the timestamp is for a data return. This signalling is performed by setting the timestamp bit and the parity bit to '1' on one clock cycle and then setting both bits to '0' on the subsequent clock.

This data return signal allows arbitrator 400 and its PAC 118 to operate more efficiently in the case when it receives a data return timestamp but has not yet received the corresponding transaction. Since arbitrator 400 knows that the transaction is a data return and not a purge, arbitrator 400 can safely send other received transactions to the processors 210.

Table 3 shows how memory accesses are strong ordered according to the present invention when using the code sequence from Table 1. Recall that a processor's "runway" is the bus 122 connecting processor board 116 to PAC 118. In addition, recall that line B is used as a semaphore for line A.

TABLE 3

| CPU0's Runway | CPU1's Runway | Timestamp |
| --- | --- | --- |
|  | Rd_Sh_or_Pr B (request) |  |
| Rd_Priv A (request) |  |  |
|  |  | Rd_Priv A (purge) |
|  |  | Rd_Priv A (reflect) |
|  |  | Rd_Sh_or_Pr B (flush) |
|  |  | Rd_Sh_or_Pr B (reflect) |

TABLE 3-continued

| CPU0's Runway | CPU1's Runway | Timestamp |
|---|---|---|
| Rd_Priv A (reflect) | | |
| Data Return A | Rd_Priv A (purge) | |
| | Rd_Sh_or_Pr B (reflect) | |
| Rd_Sh_or_Pr B (flush) | Rd_Priv A (request) | |
| C2C_Write B' | | Rd_Priv A (flush) |
| Rd_Priv A (flush) | | Rd_Priv A (reflect) |
| C2C_Write A' | Rd_Priv A (reflect) | |
| | Data Return B' | |
| | Data Return A' | |

In Table 3, CPU1's request for B is placed on CPU1's runway before CPU0's request for A is placed on CPU0's runway. Due to delay at the crossbar, CPU0's request makes it to memory first. Thus, the transactions resulting from CPU0's request are timestamped ahead of those caused by CPU1's request. Timestamping guarantees that each CPU sees the purge for A before the CPUs see the store for B.

Transactions going from the memory to a CPU's runway are always placed on the runway in the order the transactions are timestamped. Transactions going to different runways, however, can be placed on the runways out of order from when the transactions were timestamped. Accordingly, the read B ownership reflection is placed on CPU1's runway before the read B flush transaction is placed on CPU0's runway, even though the two transactions are timestamped in a different order.

Although the present invention and its advantages have been described in detail, it should be understood that various changes, substitutions and alterations can be made herein without departing from the spirit and scope of the invention as defined by the appended claims.

What is claimed is:

1. A method of maintaining strong ordering in a multi-processor computer system, the method comprising the steps of:
   timestamping a first memory transaction with a timestamp signal;
   sending the timestamp signal to an arbitrator via a first transmission path;
   sending the first memory transaction to the arbitrator via a second transmission path, wherein the second transmission path may delay sending the first memory transaction until after a second memory transaction is sent to the arbitrator; and
   reordering, by the arbitrator and using the timestamp signal, the first memory transaction before the second memory transaction if necessary.

2. The method of claim 1, further comprising the step of:
   sending, by the arbitrator, the first memory transaction followed by the second memory transaction to a processor board.

3. The method of claim 1, wherein the first transmission path is a dedicated link between a memory agent and the arbitrator having a fixed transmission time.

4. The method of claim 1, wherein the second transmission path is a crossbar switch.

5. The method of claim 1, further comprising the step of:
   sending a parity signal with the timestamp signal.

6. The method of claim 5, further comprising the step of:
   verifying the timestamp signal with the parity signal.

7. The method of claim 5, further comprising the steps of:
   determining whether the first memory transaction is a data return from the parity signal and the timestamp signal; and
   if the first memory transaction is a data return, not performing the reordering step.

8. A multiprocessor computer system having a strong ordered coherent memory, the computer system comprising:
   a memory agent for transmitting first and second memory transactions and first and second timestamps, the first and second timestamps sent in a first order;
   a crossbar for receiving the first and second memory transactions from the memory agent and transmitting the first and second memory transactions in a second order, wherein the first and second orders may be different;
   a processor agent for receiving the first and second memory transactions from the crossbar in the second order and the first and second timestamps from the memory agent in the first order; and
   an arbitrator within the processing agent for reordering the first and second memory transactions into the first order.

9. The computer system of claim 8, further comprising:
   a memory bank under control of the memory agent, the memory bank containing lines of four-state coherent memory; and
   wherein the first and second memory transactions are directed at particular memory lines.

10. The computer system of claim 8, wherein the memory agent generates first and second parity signals respectively corresponding to the first and second timestamps and transmits the first and second parity signals to the processor agent, and wherein the arbitrator verifies the first and second timestamps with the first and second parity signals.

11. The computer system of claim 10, further comprising:
    means within the arbitrator for determining, from the first and second timestamps and the first and second parity signals, a type of first memory transaction; and
    means for reordering the first and second memory transactions into a third order dependent on the type of the first memory transaction.

12. The computer system of claim 8, further comprising:
    first and second processor boards coupled to the processor agent; and
    wherein the processor agent sends the first and second memory transactions to the first and second processor boards in the first order.

13. The computer system of claim 12, wherein the first and second processor boards each comprise:
    a processor capable of generating memory transactions; and
    a cache for storing memory lines.

14. A method of maintaining strong ordering in a multi-processor computer system, the method comprising the steps of:

receiving a plurality of timestamps in a first order, wherein each timestamp is comprised of at least one bit;

receiving a plurality of memory transactions in a second order, wherein each memory transaction corresponds to a timestamp and wherein the second order may be different than the first order;

reordering, if necessary, the plurality of memory transactions into the first order indicated by the plurality of timestamps.

15. The method of claim 14, wherein the plurality of memory transactions are received from a crossbar switch.

16. The method of claim 14, further comprising the steps of:

providing a first transmission path for the plurality of timestamps; and providing a second transmission path for the plurality of memory transactions.

17. The method of claim 14, further comprising the step of:

sending the plurality of timestamps in a third order;

wherein the step of sending is performed prior to the step of receiving the plurality of timestamps, and the first order is equivalent to the third order.

18. The method of claim 14, wherein the plurality of timestamps are received from a plurality of memory agents.

19. The method of claim 18, wherein the plurality of timestamps are sent from the plurality of memory agents via a plurality of dedicated communication links having fixed transmission times.

20. The method of claim 14, further comprising the steps of:

receiving a plurality of parity signals, wherein each timestamp has a corresponding parity signal; and verifying the plurality of timestamps with the plurality of parity signals.

21. A method of maintaining strong ordering in a multi-processor computer system, the method comprising the steps of:

receiving a plurality of timestamps in a first order;

receiving a plurality of memory transactions in a second order, wherein each memory transaction corresponds to a timestamp and wherein the second order may be different than the first order;

receiving a plurality of parity signals, wherein each timestamp has a corresponding parity signal;

verifying the plurality of timestamps with the plurality of parity signals;

reordering, if necessary the plurality of memory transactions into the first order indicated by the plurality of timestamps;

determining, from selected ones of the plurality of parity signals and the plurality of timestamps, a type of a particular one of the plurality of memory transactions; and reordering the plurality of memory transactions into a third order based upon the type of the particular memory transaction.

* * * * *